United States Patent [19]

Riach

[11] 4,215,429
[45] Jul. 29, 1980

[54] RODENT-REPELLING DEVICE

[76] Inventor: George Riach, 10424 Cary Cir., Cypress, Calif. 90720

[21] Appl. No.: 363

[22] Filed: Dec. 29, 1978

[51] Int. Cl.² .................. G08B 13/22; H04B 11/00
[52] U.S. Cl. .............................. 367/139; 116/22 A
[58] Field of Search ............... 340/15; 367/189, 191, 367/139

[56] References Cited

U.S. PATENT DOCUMENTS

| | | | |
|---|---|---|---|
| 1,953,677 | 4/1934 | Glover | 116/22 A |
| 2,570,081 | 10/1951 | Szczeniowski | 116/22 A X |
| 3,891,962 | 6/1975 | White | 340/15 |
| 4,097,838 | 6/1978 | Fiala | 340/15 |

Primary Examiner—Daniel M. Yasich

Attorney, Agent, or Firm—Francis X. LoJacono

[57] ABSTRACT

An energy-pulsating rodent-repelling device designed to discourage rodents, especially of the burrowing type, from inhabiting a general area above and below the ground surface within the vicinity of the operating device which includes a plurality of electrically energized coils mounted to a single probe which is inserted into the ground surface area known to be inhabited by the animals, whereby the coils are randomly energized in an inconsistent manner provided by a plurality of switches which create an irregular flow of sonic waves and physical vibrations that are imparted and transferred throughout the general surface and subsurface ground area, thereby causing a disturbing effect upon the rodents and encouraging them to leave the affected area without direct physical harm to them.

4 Claims, 7 Drawing Figures

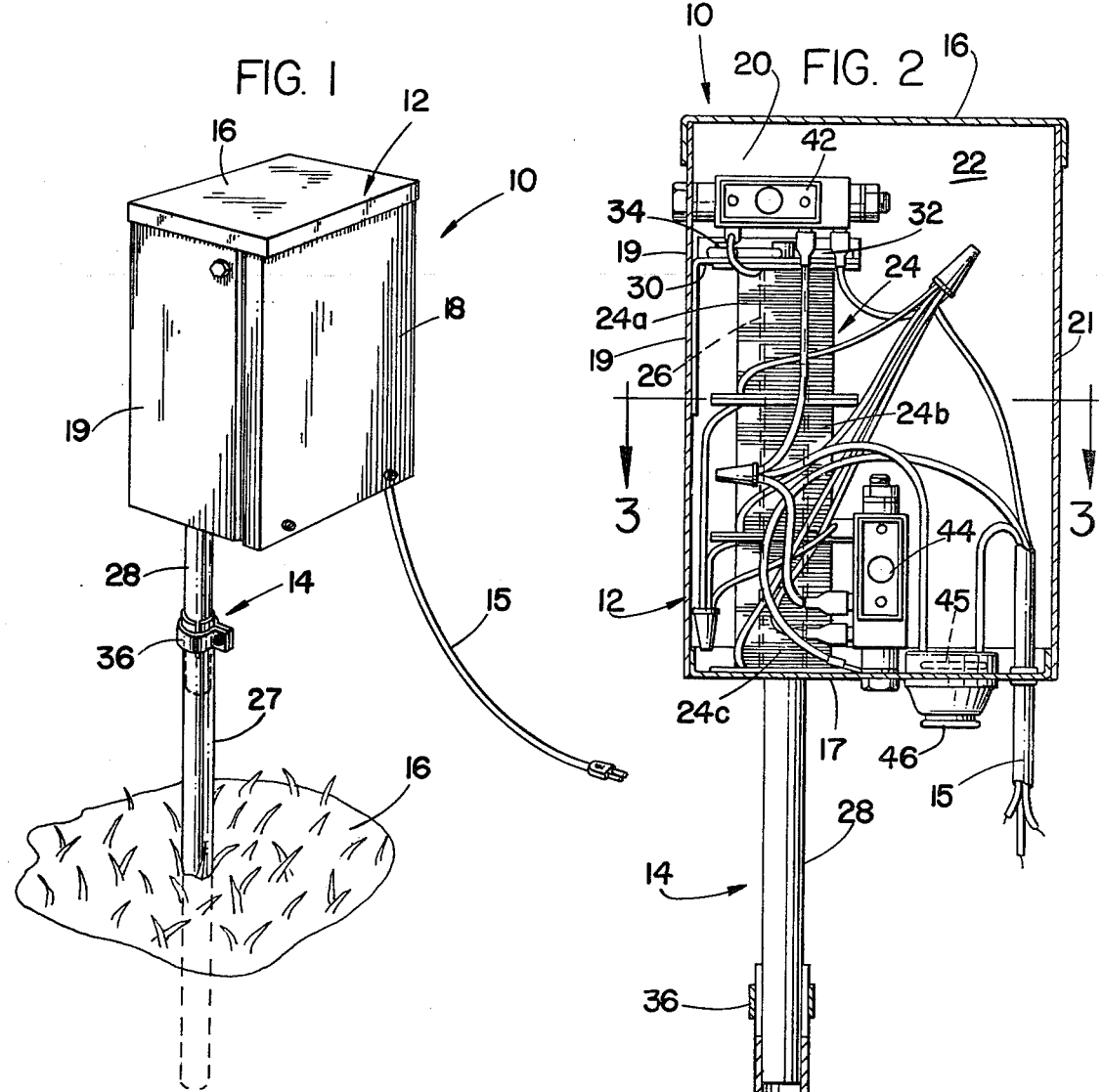
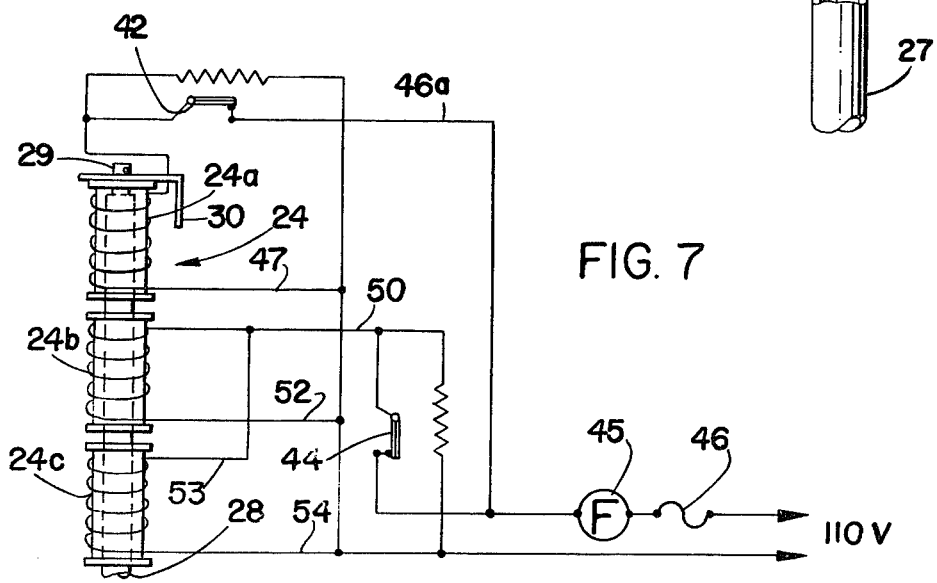

RODENT-REPELLING DEVICE

BACKGROUND OF THE INVENTION

1. Field of the Invention

This invention relates generally to a device that causes a disturbing effect on rodents, and more particularly to a device of this character which creates sonic waves and physical vibrations that are transferred into the surface and subsurface ground areas of the inhabiting animals.

2. Description of the Prior Art

As is well known in the art, various problems and difficulties are encountered in providing suitable means for controlling the invasion of rodents, especially the burrowing type that live under the surface of the ground.

Many types of devices have been used for the control of these animals. However, these devices have features that restrict their use, and they are often complicated to operate and/or expensive to maintain. Most devices employed in rodent control have generally been found in two areas—one being chemical with the use of dangerous poisons and the other being mechanical with the use of hazardous traps in various arrangements.

An additional method is now being employed which relates to electrical devices or electronic-control units. One such device is disclosed in U.S. Pat. No. 4,048,746 to Joseph R. Dye, this device being designed as an electronic eradicating device used to destroy underground rodents such as gophers in their burrows. This unit employs the use of a high voltage to flow through the rodents bodies at a set time, using the earth as an electrical ground. This patent—like many others—is on a one-to-one basis. That is, each individual rodent must contact the device, and thus it must be constantly changed from one location to another.

Other known prior-art devices are presented in U.S. Pat. No. 2,783,581; No. 2,805,067; No. 3,058,250 and No. 3,827,176. These patents generally disclose devices that kill the rodents; whereas the applicant's device does not kill the animals, but rather causes them to evacuate in large numbers from very large areas such as, for instance, farm acreage that is very often infested with various types of rodents which create enormous amounts of yearly damage to crops. Thus, the applicant's device is designed to rid large areas at one time, rather than on a one-to-one basis as with the known art disclosed.

SUMMARY OF THE INVENTION

The present invention provides an electronic rodent repelling device that does not harm the animals, but has a disturbing affect on their systems, causing the animals to seek other areas to inhabit. Such a device is very desirable for use in farm areas that are infested with such rodents. The repelling device as herein disclosed is designed to create—within the surface and subsurface areas surrounding said device—radiating sonic waves and physical vibrations which are transmitted outwardly from the positioned device over large areas. Thus, the problems of the one-to-one relationship of the prior art, and the necessity for individually killing each rodent can now be solved by incorporating a single repeller in a given area, whereby hundreds of rodents below and above ground will evacuate that given area.

The present device comprises a housing having mounted therein a plurality of coils that are adapted to receive a single metal bar. The coils are energized electrically—but in an irregular manner—by means of a plurality of switches and a phase energizer. The bar is affixed to a pipe which is driven to a substantial depth within the subsurface earth. Sonic waves created within the bar are transmitted through the submerged pipe, and imparted within the surface and subsurface of the ground area. Further, physical irregular vibrations are induced into the pipe from the bar and are transferred to the surrounding area. Together, the sonic waves and the transmitted vibrations react negatively with the targeted areas of the rodents habitat, and thus cause them to seek other areas. Hence, depending upon the type and the condition of the soil, several acres can be protected by such a signal device.

OBJECTS AND ADVANTAGES OF THE INVENTION

The present invention has for an important object a provision wherein a single repeller can cause a multitude of rodents to evacuate a given area by means of inducing sonic waves and vibrations within the surface and subsurface of the earth surrounding the device.

It is another object of the invention to provide a rodent-repelling device that does not kill the animals, and wherein the animals do not come in direct contact with any portion of the device.

It is still another object of the invention to provide a rodent repeller of this type that incorporates a plurality of vibrator coils mounted in alignment with a probe member, whereby irregular signals are transmitted therethrough and imparted into the earth.

It is a further object of the invention to provide a device of this character that has relatively few operating parts.

It is still a further object of the invention to provide a device of this type that is easy to service and maintain, and that is inexpensive to manufacture.

It is still a further object of the invention to provide a rodent repeller of this character that is simple and rugged in construction so as to operate well under adverse conditions.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only, and in which like reference characters are employed to designate like parts throughout the same:

FIG. 1 is a pictorial view of the rodent-repelling device shown supported in the ground;

FIG. 2 is an enlarged cross-sectional view taken substantially along line 2—2 of FIG. 4;

FIG. 7 is a diagrammatic drawing of the electrical wiring thereof.

DESCRIPTION OF THE PREFERRED EMBODIMENT

Figure 3:
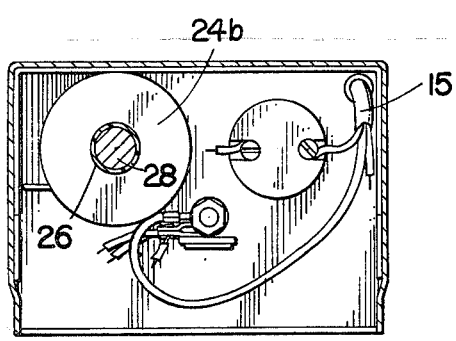
FIG. 3 is a cross-sectional view taken substantially along line 3—3 of FIG. 2.
Figure 5:
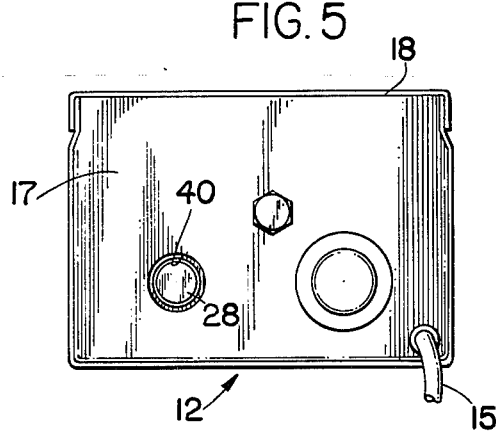
FIG. 5 is a bottom plan view of the device.

Referring more particularly to FIG. 1, there is shown a rodent-repelling device, generally indicated at 10, having a box-like housing 12 from which a probe means, designated at 14, is extended downwardly therefrom. Probe means 14 is adapted to be supported within the earth or ground 16 to a predetermined depth below the ground surface. The depth to which the probe means is inserted into the ground varies with the soil condition in a given area—the depth being determined, for example, by such variations as loose sandy soil, compact soil, wet soil, or very dry soil. Thus, once the condition of the soil is analyzed, the optimum depth for the probe means 14 can be established in order to provide the most efficient and effective response over the given area inhabited by the rodents.

Further, illustrated in FIG. 1 is an electric cord 15 of any suitable conventional type that is capable of being connected to the common 110 volt outlet, which is necessary to operate the present device.

Accordingly, however, the arrangement of the present invention does not provide for or allow the direct current to flow from cord 15 into the surface or subsurface of the ground, as is required by many of the previous devices. It should be readily understood that the rodent repeller as herein disclosed is designed to operate on a high-input voltage whereby the repeller only emits audible sounds, sonic waves and physical vibrations which are transmitted along the ground surface and within the subsruface; and, thus, there is created by these three output signals a condition wherein rodents are irritated to a point where they will be induced to evacuate the affected area.

The rodent repeller comprises housing 12 having a top wall 16, a bottom wall 17, and four side walls 18, 19, 20 and 21 —side wall 18 being removable therefrom. Thus, the above walls define an enclosed compartment 22. Vertically mounted one above the other within compartment 22 are a plurality of vibrator means, generally indicated at 24. The vibrator means 24 as herein shown comprises first, second and third solenoid coil members 24a, 24b and 24c, respectively. The coil members are stacked one above the other so as to be vertically aligned to receive a portion of the probe means. These coils may be of any known suitable type; or they can be provided with a predetermined winding to establish the needed magnetic response to drive probe means 14.

Accordingly, each coil member includes a centrally aligned bore 25 in which is disposed a plastic tubular member 26, the tubular member 26 being interposed between coils 24a, 24b and 24c, and the upper portion of the probe means 14. Probe means 14 comprises a first probe member 28 and a second probe member 27, the upper portion being a cylindrical metal bar 28 having one end thereof passing through each stacked coil, whereby the coils 24a, 24b and 24c are firmly affixed to bar 28 and tube member 26.

Means is provided to movably attach housing 12 to the coils and the probe means. That is, bar 28 extends upwardly through coil member 24a, wherein a reduced diameter lug 29 is provided at the tip end of bar 28. Lug 29 is received by bracket support 30 attached to one wall of housing 12, and movably fastened thereto by pin 32. Pin 32 allows bar 28 to physically vibrate when the coils are energized. Since the coils are affixed to bar 28, they too will physically move with bar 28 as a single unit.

Also provided is a means to limit the movement by the bar and the coils. That is, a keeper pin 34 is affixed to bracket 30; and pin 32 is connected at one end to the keeper pin 34—thereby preventing any rotational movement of the bar. Thus, a rocking movement is established as the coils are activated.

Second probe member 27 of the probe means 14 comprises an elongated pipe adapted to be secured to the lower end of bar 28 by a clamp 36, the upper free end of pipe 29 including a plurality of slots to allow a firm connection therebetween. Thus, all signals generated between the coils 24 and the bar 28 are transferred to pipe 29, and then disseminated within the surface and subsurface ground area.

Figure 4:
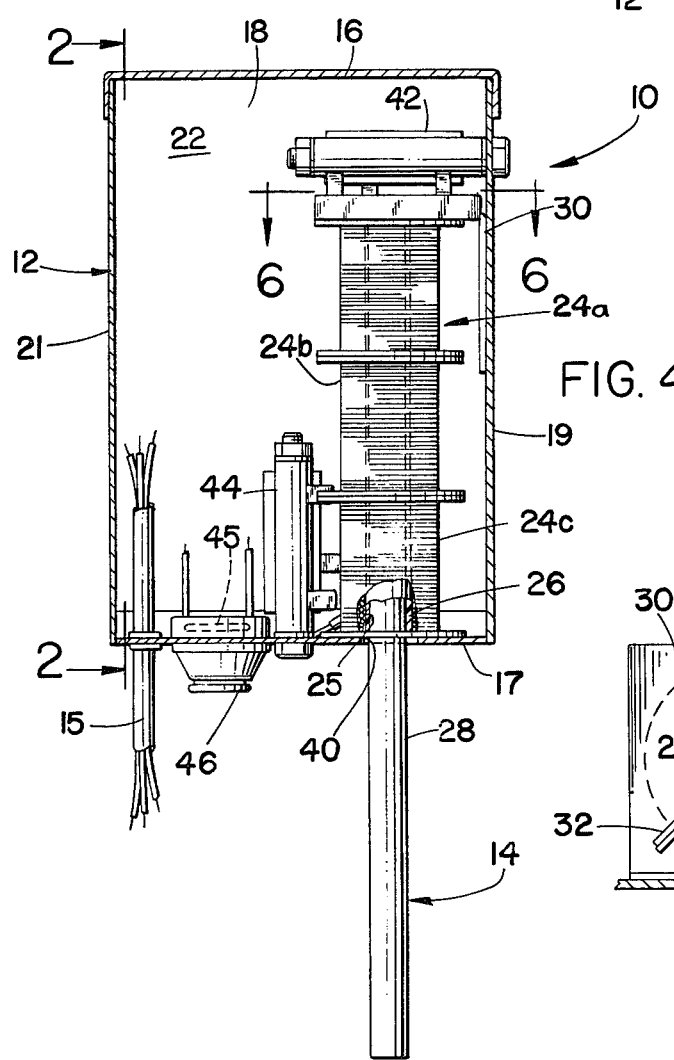
FIG. 4 is a rear view of the device with the back wall removed.
Figure 6:
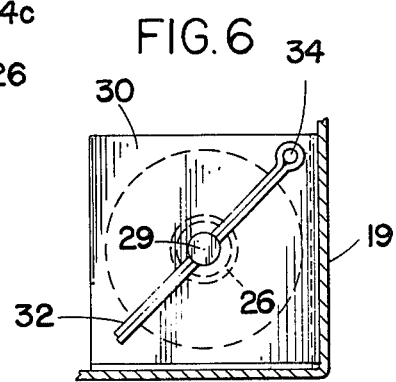
FIG. 6 is a cross-sectional view taken substantially along line 6—6 of FIG. 4, showing a top view of the solenoid with the probe means attached thereto.

Sound is provided by means of an aperture 40 located in bottom wall 17 having an enlarged diameter greater than the diameter of bar 28, allowing bar 28 to extend downwardly therethrough, as seen in FIG. 4. When vibration is established and the probe means is positioned firmly in the ground, housing 12 will tend to oscillate, thus causing the annular edge of aperture 40 to strike bar 28 and thereby providing a sound which is also transmitted through the probe means into the subsurface area.

As previously disclosed, the device as shown includes three solenoid coils 24a, 24b and 24c; however, these coils are electrically actuated so that they are consistently and intermittently energized. Thus, there is provided means for intermittently activating the coils which comprise a pair of bimetal switches 42 and 44, and a phase-energizer means defined by an intermittent flasher 45, seen in the wiring diagram of FIG. 7. FIG. 7 shows the electrical circuit which further includes a fuse 46.

Accordingly, as current is applied to the circuit, the normally closed switches will react independently from each other, but are further controlled by flasher means 45. That is, when current flow passes through flasher means 45, it will activate switch when closed 42 which is arranged by wires 46a and 47 to allow energy to flow to coil 24a and thus activate bar 28. At the same time, closed switch 44 is activated—thus allowing energy to flow through both coils 24b and 24c by means of wire connections 50, 52, 53 and 54.

With this circuit arrangement, each independent switch 42 and 44 will be energized as conventional by flasher means 45 when each respective switch is in a closed position; and each switch will automatically switch on and off at varying intervals. Thus, coils 24b and 24c are activated together; while coil 24a is activated so as to independently operate with respect to coils 24b and 24c. This independent operation of the coils creates both a successive and overlapping energizing of the respective coils, wherein random irregular signals of sounds, sonic waves, and physical vibrations are produced and transferred through probe 14, and into the surface and subsurface of the surrounding ground area—creating a disturbance that affects the rodents inhabiting the area.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A rodent-repelling device adapted to be supported within the ground and comprising:
   a housing defined by side walls, a top cover, and a bottom wall having an enlarged opening disposed therein;
   vibrating means located within said housing and comprising at least two solenoid coil units, each being independently and randomly activated;
   probe means comprising a first probe member and a second probe member, said first probe member defined by a metal bar member having said solenoid coils supported and affixed thereto, with one end of said bar extending outwardly through said enlarged opening in said housing, said second probe member having one end secured to said metal bar member and the opposite end thereof adapted to be received in said ground;
   means connected to said solenoid coil units to supply electrical energy thereto, whereby a plurality of signals are generated between said coil units and said first and second probes so as to be transmitted into said ground;
   means therein to cause intermittent current flow from said electrical energy to said coil units; and
   means within said housing to provide movement between said housing and said probe members, said movement means comprising a bracket fixedly mounted to one wall of said housing and adapted to movably support one end of said probe-bar member, whereby said probe-bar member moves independently from said housing, whereby said probe bar member engages said bottom wall.

2. A rodent-repelling device as recited in claim 1, wherein said intermittent current-flow means comprises:
   a first switch members connected to at least one of said solenoid coils to independently operate said solenoid coils; and
   a second switch members connected to at least one of the remaining solenoid coils, whereby said second switch members operates independently of said first switch members.

3. A rodent-repelling device as recited in claim 2, wherein said intermittent current-flow means includes a phase-energizer members to provide intermittent current flow to energize said first and said second switch means.

4. A rodent-repelling device as recited in claim 1, wherein said means to provide movement between said housing and said probe means further includes:
   a support pin attached to an opposite end of said probe-bar member; and
   a keeper pin adapted to connect with said support pin to prevent movement thereof.

* * * * *